(12) United States Patent
Heung et al.

(10) Patent No.: US 7,666,807 B2
(45) Date of Patent: Feb. 23, 2010

(54) HOLLOW POROUS-WALL GLASS MICROSPHERES FOR HYDROGEN STORAGE

(75) Inventors: Leung K. Heung, Aiken, SC (US); Ray F. Schumacher, Aiken, SC (US); George G. Wicks, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 476 days.

(21) Appl. No.: 11/256,442

(22) Filed: Oct. 21, 2005

(65) Prior Publication Data

US 2006/0059953 A1  Mar. 23, 2006

Related U.S. Application Data

(63) Continuation-in-part of application No. 10/946,464, filed on Sep. 21, 2004.

(51) Int. Cl.
  B01J 35/08   (2006.01)
  B01J 21/00   (2006.01)
  B01J 21/04   (2006.01)

(52) U.S. Cl. .................. 502/8; 502/262; 502/439
(58) Field of Classification Search ............ None
See application file for complete search history.

(56) References Cited

U.S. PATENT DOCUMENTS

| | | | |
|---|---|---|---|
| 2,676,892 A | 4/1954 | McLaughlin | |
| 2,797,201 A | 6/1957 | Veatch | |
| 2,978,339 A | 4/1961 | Veatch | |
| 2,978,340 A | 4/1961 | Veatch | |
| 3,230,064 A | 1/1966 | Veatch | |
| 3,365,315 A | 1/1968 | Beck | |
| 3,513,106 A | 5/1970 | Chapman | |
| 3,699,050 A | 10/1972 | Henderson | |
| 3,794,503 A | 2/1974 | Netting | |
| 3,796,777 A | 3/1974 | Netting | |
| 4,042,359 A | 8/1977 | Schnabel | |
| 4,119,422 A | 10/1978 | Rostoker | |
| 4,163,637 A | 8/1979 | Hendricks | |
| 4,211,537 A | 7/1980 | Teitel | |
| 4,257,798 A * | 3/1981 | Hendricks et al. | 65/21.4 |
| 4,302,217 A | 11/1981 | Teitel | |
| 4,328,768 A | 5/1982 | Tracy | |
| 4,336,338 A | 6/1982 | Downs | |
| 4,391,646 A | 7/1983 | Howell | |
| 4,637,990 A * | 1/1987 | Torobin | 502/10 |
| 4,661,137 A | 4/1987 | Garnier et al. | |
| 4,671,994 A | 6/1987 | Cochran, Jr. | |
| 4,778,502 A | 10/1988 | Garnier | |
| 4,842,620 A | 6/1989 | Hammel et al. | |
| 4,853,001 A | 8/1989 | Hammel | |
| 4,933,307 A | 6/1990 | Marshall et al. | |
| 5,069,702 A | 12/1991 | Block | |
| 5,176,732 A | 1/1993 | Block | |
| 5,225,123 A | 7/1993 | Torobin | |
| 5,227,239 A | 7/1993 | Upadhye | |
| 5,248,649 A * | 9/1993 | Mosley, Jr. | 502/262 |
| 5,256,180 A | 10/1993 | Garnier | |
| 5,397,759 A | 3/1995 | Torobin | |
| 5,411,928 A | 5/1995 | Heung | |
| 5,443,616 A | 8/1995 | Congdon | |
| 5,492,870 A | 2/1996 | Wilcox | |
| 5,534,348 A | 7/1996 | Miller | |
| 5,770,416 A * | 6/1998 | Lihme et al. | 435/176 |
| 5,958,098 A | 9/1999 | Heung | |
| 5,965,482 A | 10/1999 | Heung | |
| 6,015,106 A | 1/2000 | Turgeon | |
| 6,231,642 B1 | 5/2001 | Shelby et al. | |
| 6,358,531 B1 | 3/2002 | Day | |
| 6,358,532 B2 | 3/2002 | Starling et al. | |
| 6,528,441 B1 | 3/2003 | Heung | |
| 6,589,312 B1 | 7/2003 | Snow | |
| 6,667,261 B1 | 12/2003 | Anshits et al. | |
| 2004/0065171 A1 * | 4/2004 | Hearley et al. | 75/255 |
| 2004/0101740 A1 | 5/2004 | Sanders | |

FOREIGN PATENT DOCUMENTS

EP   150 288 A2   8/1985

OTHER PUBLICATIONS

Spherical hydrogen targets for laser-produced fusion (Irena Lewkowicz, J. Phys. D: Appl. Phys., vol. 7, 1974.*
Budov, V.V., Hollow Glass Microspheres. Use, Properties, and Technology (Review), *Glass and Ceramics*, vol. 51, Nos. 7-8, 1994, pp. 230-235, Plenum Publishing Corporation, New York, NY US.
Duret & Saudin, "Microspheres For On-Board Hydrogen Storage", Int. J. Hydrogen Energy, Elsevier Science Publishers, B.V., Barking, GB, vol. 19, No. 9, pp. 757-764, 1994.
European Patent Office, Written Opinion of the International Searching Authority, Jan. 2, 2007, 4 Pages.
European Patent Office, International Search Report, Jan. 2, 2007, 4 Pages.

* cited by examiner

*Primary Examiner*—Sheeba Ahmed
(74) *Attorney, Agent, or Firm*—J. Bennett Mullinax, LLC

(57) ABSTRACT

A porous wall hollow glass microsphere is provided having a diameter range of between 1 to 200 microns, a density of between 1.0 to 2.0 gm/cc, a porous-wall structure having wall openings defining an average pore size of between 10 to 1000 angstroms, and which contains therein a hydrogen storage material. The porous-wall structure facilitates the introduction of a hydrogen storage material into the interior of the porous wall hollow glass microsphere. In this manner, the resulting hollow glass microsphere can provide a membrane for the selective transport of hydrogen through the porous walls of the microsphere, the small pore size preventing gaseous or liquid contaminants from entering the interior of the hollow glass microsphere.

6 Claims, 3 Drawing Sheets

HOLLOW POROUS-WALL GLASS MICROSPHERES FOR HYDROGEN STORAGE

RELATED APPLICATIONS

This application is a Continuation-In-Part of U.S. application Ser. No. 10/946,464, filed on Sep. 21, 2004, and which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC0996-SR18500 awarded by the United States Department of Energy. The Government has certain rights in the invention.

FIELD OF THE INVENTION

This invention is directed towards hollow glass microspheres and a process of using the microspheres as part of a hydrogen storage system. The hollow glass microsphere wall defines a series of pores. The pores facilitate the placement of a hydrogen storage material within the interior of the hollow glass microsphere. The porosity of the hollow glass microspheres can thereafter be modified by either altering or reducing the overall pore size or by coating the individual hollow glass microspheres so as to maintain the hydrogen storage material within a sealed interior of the hollow glass microsphere. The coating and/or the controlled pore size enables the selective absorption of hydrogen gas through the walls of the hollow glass microsphere while isolating the hydrogen storage material encapsulated therein from other external gases and fluids.

The hollow glass microspheres can thereafter be subjected to variations in temperature, pressure, or other release stimulus triggers to bring about the release of hydrogen gas. Once dehydrided, the hollow glass microspheres and hydrogen storage material can be reused so as to once again selectively absorb hydrogen gas.

BACKGROUND OF THE INVENTION

The formation of hollow glass microspheres (HGMs) is well known in the art. The production of hollow glass microspheres has been described in U.S. Pat. No. 3,365,315 (Beck); U.S. Pat. No. 4,661,137 (Garnier); and U.S. Pat. No. 5,256,180 (Garnier), and which are incorporated herein by reference.

It is also known in the art to produce large macrospheres having hollow glass walls which provide a semipermeable liquid separation medium for containing absorbents. The production of macrosphere structures can be seen in reference to U.S. Pat. Nos. 5,397,759 and 5,225,123 to Torobin and which are incorporated herein by reference. The Torobin references disclose hollow glass macrospheres comprising multiple particle glass walls. The reference teaches the use of the macrospheres for gas/liquid separation and for use with absorbents but does not discuss any features or characteristics which would make the macrospheres suitable as a hydrogen storage medium.

U.S. Pat. No. 4,842,620 (PPG Industries) is directed to non-crystalline silica fibers having porous walls which are used in gas separation. The fibers described in this application have different physical characteristics than microspheres and which makes fibers less desirable with respect to hydrogen separation and storage capabilities.

U.S. Pat. No. 6,358,532 (CaP Biotechnology, Inc.) uses porous-wall hollow glass microspheres for cell clustering and biomedical uses. The porous-wall structures are designed to readily release microsphere contents when present within a biotic system. Alternatively, the microspheres are used to provide a substrate to support cell growth within the porous-wall structure.

While the above references disclose a variety of glass microspheres and porous-wall structures having various uses in material separation or drug delivery capabilities, there remains room for improvement and variation within the art.

SUMMARY OF THE INVENTION

It is at least one aspect of at least one embodiment of the present invention to provide for a porous wall hollow glass microsphere (PWHGM) having a diameter range of between about 1.0 micron to about 200 microns, a density of about 1.0 gm/cc to about 2.0 gm/cc, and having a porous-wall structure having wall openings with an average pore size of between about 10 angstroms to about 1000 angstroms, which contains within an interior of the hollow glass microsphere a hydrogen storage material.

It is another aspect of at least one embodiment of the present invention to provide for a hollow glass microsphere containing therein an effective amount of the hydrogen storage material palladium, the hollow glass microsphere having a pore size which prevents the loss of palladium fines from the interior of the hollow glass microsphere.

It is at least one aspect of at least one embodiment of the present invention to provide for a porous wall hollow glass microsphere (PWHGM) having a diameter range of between about 1.0 to about 200 microns, a density of about 1.0 gm/cc to about 2.0 gm/cc, and having a porous-wall structure having wall openings with an average pore size which may range from about 10 to about 1000 angstroms, and which contains within an interior of the hollow glass microsphere a hydrogen storage material, the exterior wall of the hollow glass microsphere containing a barrier coating sufficient to prevent gaseous or liquid contaminants from entering an interior of the PWHGM while permitting the passage of hydrogen gas through the exterior wall.

It is a further aspect of at least one embodiment of the present invention to provide for a process of introducing a hydrogen storage material into an interior space of a hollow glass microsphere.

It is yet a further aspect of at least one embodiment of the present invention to provide for a process of introducing a hydrogen storage material into an interior of a porous wall hollow glass microsphere comprising providing a supply of porous wall hollow glass microspheres; subjecting said supply of porous wall hollow glass microspheres to a partial vacuum, thereby decreasing the volume of ambient gasses contained within the interior spaces of said porous wall hollow glass microspheres; surrounding said porous wall hollow glass microspheres with a solution containing a hydrogen storage material while said porous wall hollow glass microspheres are at a reduced pressure; increasing the pressure surrounding said porous wall hollow glass microspheres and said hydrogen storage material containing solution, thereby introducing the hydrogen storage containing solution into the interior spaces of said porous wall hollow glass microspheres; removing the excess hydrogen storage containing solution from the supply of porous wall hollow glass microspheres; drying the porous wall hollow glass microspheres; and, reducing the hydrogen storage material within the porous wall hollow glass microspheres using a combination of hydrogen gas and heat, thereby providing a plurality of porous wall hollow glass microspheres containing reduced hydrogen storage material within the interior of the microsphere.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawing.

DESCRIPTION OF THE PREFERRED EMBODIMENT

Figure 1:
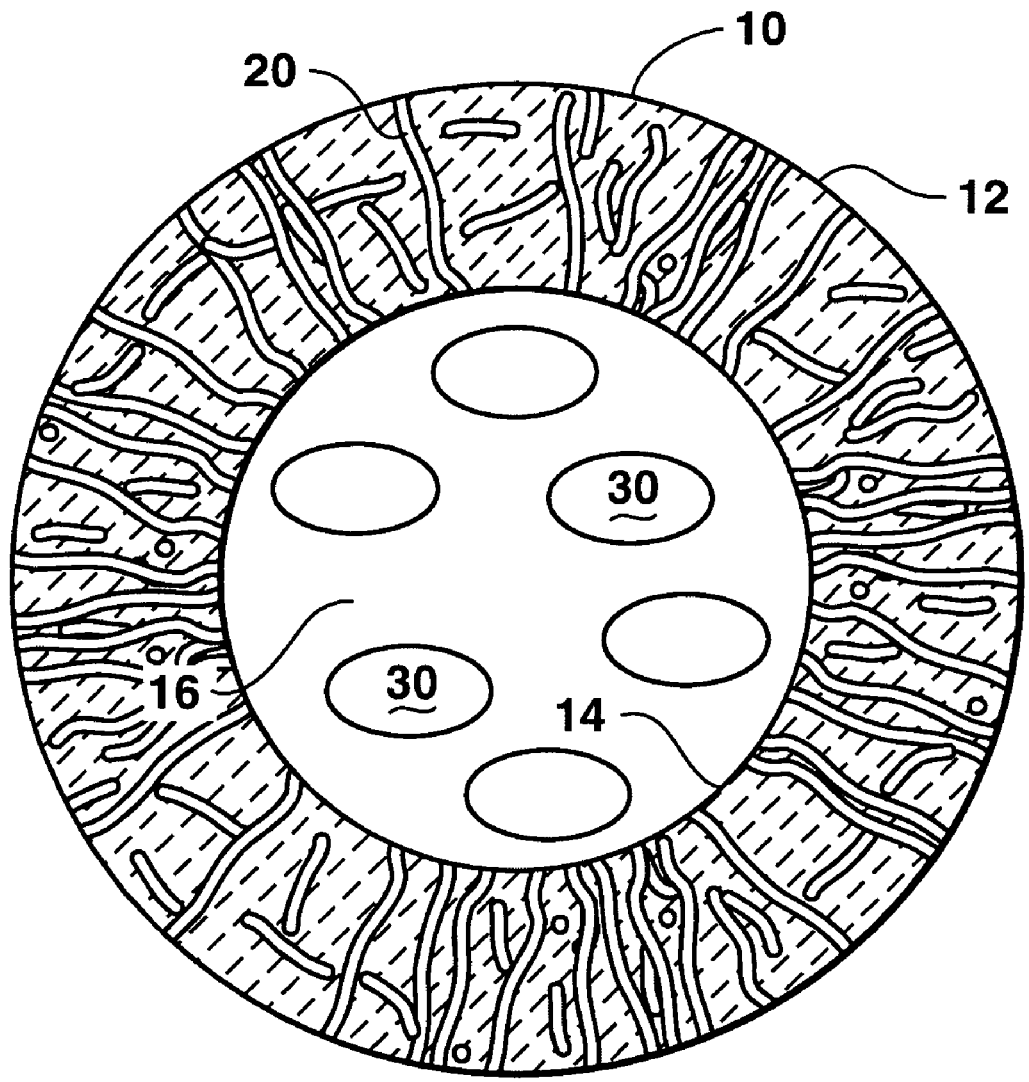
FIG. 1 is a cross sectional view of a hollow glass porous-wall microsphere containing a hydrogen storage material within the interior of the microsphere.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

The porous wall hollow glass microspheres of the present invention are prepared using a special glass composition which after appropriate heat treatment separates into two continuous glass phases. In the examples provided herein, one of the phases is rich in silica, while the other is an extractable phase. The extractable phase is preferably present in an amount of at least about 30 weight percent of the total glass composition. However, other porous glass compositions may be used.

The extractable phase of the glass composition preferably includes boron-containing materials such as borosilicates or alkali-metal borosilicates. Suitable borosilicates and alkali-metal silicates may be found in reference to the teachings of U.S. Pat. No. 4,842,620 directed to leachable glass fiber compositions and which is incorporated herein by reference.

The extractable and non-extractable glass components are mixed, melted, quenched, and crushed to a fine glass powder consisting of individual glass particles having a particle size of about 5 to 50 microns. The individual glass particles are then reheated using a gas/oxidizer flame. The glass is raised to a temperature where a latent blowing agent within the glass, such as alkali sulfate along with various hydrates, carbonates, and halides, the selection and use of which are well known in the art, causes a single bubble to nucleate within each particle of glass. As the glass particle temperature increases by exposure to the flame, the glass particle reaches a viscosity where the particle transforms to a sphere due to the surface tension forces. As the temperature increases, the pressure within the bubble exceeds the surface tension/viscous forces value and the bubble expands to form a hollow glass microsphere. The hollow glass microsphere is then rapidly quenched to room temperature.

Preferably, the resulting hollow glass microspheres have densities in the range of about 0.10 gm/cc to about 0.5 gm/cc and diameters may range between about 1 to about 200 microns. Once formed, the hollow glass microspheres may be separated on the basis of density so as to select and segregate the hollow glass microspheres according to desired densities. Additionally, it is possible to separate the non-porous HGMs according to the microsphere diameter.

The resulting hollow glass microspheres have a glass wall composition in which the glass is essentially homogeneous. The hollow glass microspheres may be heat treated to enhance the glass-in-glass phase separation by mixing the hollow glass microspheres with carbonaceous materials and heating in the absence of oxygen to the desired temperature region. After heat treating the hollow glass microspheres, the homogeneous glass separates into two continuous glass phases: one extractable and the other rich in silica. The extractable phase is readily leachable using strong mineral acids which results in the formation of wall pores within the remaining silica-rich phase. Suitable mineral acids and methods for leaching the glass may be seen in reference to U.S. Pat. No. 4,842,620 which is incorporated herein by reference.

The resulting hollow glass microspheres exhibit a high degree of cell wall porosity. As used herein, the term "porosity" means a series of pores and similar openings which either directly or indirectly define a series of passageways which provide communication between the interior and the exterior of the hollow glass microsphere. An average cell wall pore size of about 10 angstroms to about 1000 angstroms can be achieved using this technology. The cell wall pore size and porosity is dependent upon the percentage of extractable components formulated into the special glass composition used in the formation of the PWHGM and the degree of heat treatment employed. The duration and severity of the extraction process also can have some influence on the characteristics of the resulting cell wall pores including size and density of pores formed.

As seen in reference to FIG. 1, a cross section through a PWHGM 10 is provided. Microsphere 10 comprises a glass wall having an exterior surface 12 and an interior surface 14. The microsphere 10 further defines a hollow cavity 16 within the interior of the microsphere. As best seen in reference to the Figure, a plurality of pores 20 are defined within the glass wall of the microsphere. As illustrated in FIG. 1, a number of the pores 20 provide for communication between an exterior of the PWHGMs and the interior cavity 16 of the PWHGMs. Present within the hollow cavity 16 is a hydrogen absorption material 30. The placement of the hydrogen storage material within the cavity 16 is provided in greater detail below.

Figure 2:
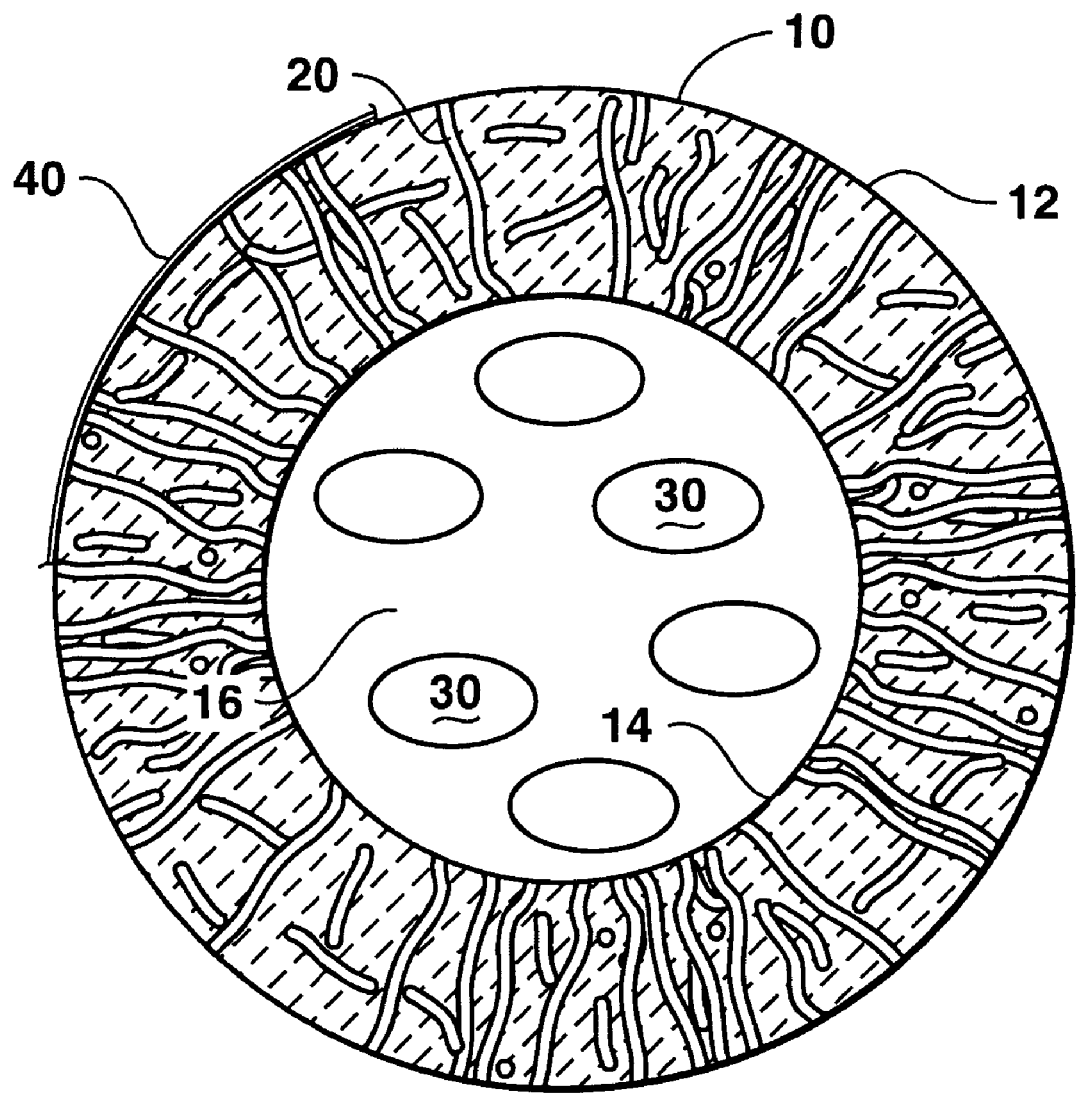
FIG. 2 is a cross sectional view similar to FIG. 1 showing a microsphere having an exterior coating.

Once a desired amount of hydrogen absorption material is present within the hollow glass microsphere, the porosity of the hollow glass microsphere wall can be altered or reduced by additional heat treatment. Alternatively, the pores can be effectively sealed by applying a coating material 40 such as tetraethyl orthosilicate solution and as illustrated in FIG. 2. The coating material can be formulated to permit the diffusion of hydrogen while excluding other gases.

Example 1

PWHGMs were formed from a silicate glass composition containing boron oxide, alkaline earths, and alkali as seen in Table 1 set forth below. The glass composition of the microspheres was heat treated at a temperature of about 600° C. for at least 10 hours. It is believed that the 10 hour time interval is sufficient to allow the glass and the microsphere walls to separate into two continuous glass phases by the known process of spinodal decomposition. In so doing, two interconnected glass phases are formed within the walls of the microspheres. A the walls of the microspheres. A first glass phase consists of a high percentage of silica while the second glass phase contains a greater percentage of the alkali and borate material. The alkali borate phase has a greater solubility in a heated acid solution (80-85° C.) of 2-3 N HCL solution. During the leaching process it was observed that the PWHGMs began sinking in the solution indicating that leaching of soluble components believed to be the alkali borate phase was occurring.

TABLE 1

GLASS COMPOSITION

| Glass Powder | (Calculated) | Unleached HGMs (Chemical Analysis) | PWHGMs (Chemical Analysis) |
|---|---|---|---|
| SiO2 | 59.85 wt % | 70.2 wt % | 88.25 wt % |
| B2O3 | 22.11 | 16.3 | 04.91 |
| CaO | 06.09 | 08.08 | 01.66 |
| F | 02.03 | ND | ND |
| ZnO | 01.78 | 01.64 | 00.36 |
| Na2O | 03.9 | 02.51 | 00.69 |
| P2O5 | 00.77 | ND | ND |
| SO3 | 01.25 | ND | ND |
| Li2O | 03.0 | 02.32 | 00.54 |
| Total | 100.78 | 101.05 | 96.4 |

Following the leaching process, the PWHGM cell wall contains small interconnected pores predominantly in the range of about 10 to about 1000 Angstroms and which pass completely through the PWHGM wall.

It was further observed that following the leaching process, PWHGMs exhibited a weight loss of approximately 33% which is again indicative of the formation of pores through the selective removal of the alkali borate phase. Further, using a gas pycnometer, the density of the glass microspheres changes from about 0.35 g/cc (unleached) to a density of about 1.62 g/cc for the leached PWHGMs. The increase in density is further indicative that the alkali borate material has been selectively removed and that openings exist for the gas to enter the interior of the PWHGMs causing the increase in density. It is noted that the density of fused silica is about 2.2 g/cc. It is believed that the PWHGM density following extraction approaches the value of fused silica, but the lower density is indicative that a small percentage of PWHGMs are not porous or that during the drying process a gel film may have formed over some of the pores and/or not all of the alkali borate phase was extracted during the heated acid treatment.

The PWHGMs made according to Example 1 above were compared to commercially obtained non-porous hollow glass microspheres for determination of total surface area. Using gas absorption techniques, it was demonstrated that the surface area of the non-porous commercial samples was approximately 1 square meter/gram. The surface area of the PWHGMs made according to the present invention was 29.11 square meter/gram. The increased surface area of the PWHGMs indicates a significant increase in surface area reflective of the formation of pores. It is noted that if the PWHGMs simply had holes present within the walls, the surface area would merely include the interior and exterior surfaces for an expected value of approximately 2 square meters/gram. Additional analysis of the PWHGMs using gas absorption/deabsorption indicated an average pore size of about 553 Angstroms.

Once formed, the PWHGMs can be filled with a hydrogen absorbent such as palladium. To successfully introduce palladium into the interior of the PWHGMs, palladium chloride can be forced through the porous glass walls using pressure. Following the introduction of palladium chloride, hydrogen is then introduced under pressure to reduce the palladium chloride to palladium metal. Subsequent heat and vacuum drying may be used to remove any residual hydrochloric acid or water. This process can be repeated through several cycles to increase the amount of palladium ultimately encapsulated within the hollow glass microsphere.

Example 2

Figure 3:
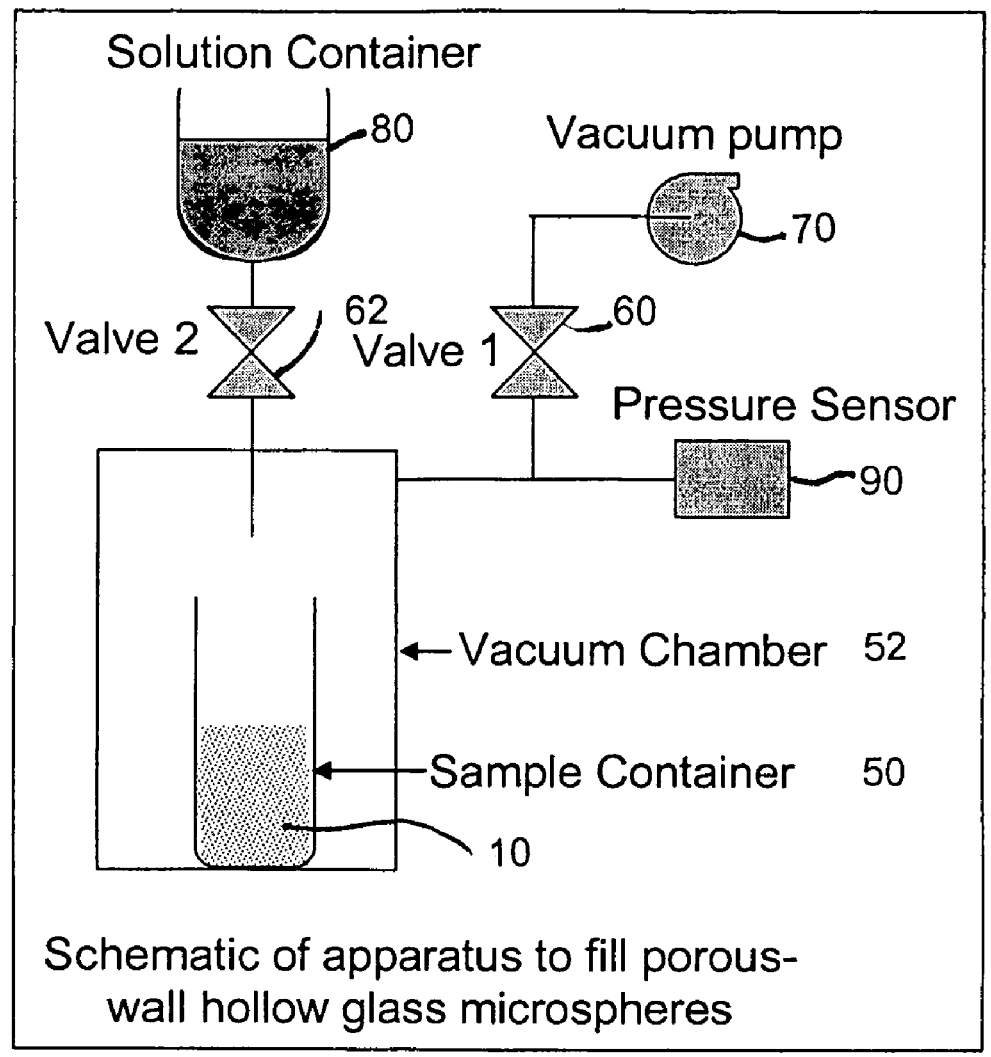
FIG. 3 is a schematic view of a process setting forth an exemplary process which may be used to introduce materials into an interior of a hollow glass microsphere.

As set forth in reference to FIG. 3, an additional process may be used to introduce a hydrogen storage material into the interior of PWHGMs.

While it is believed that a variety of soluble hydrogen storage materials may suffice, one example of a palladium containing solution of tetraamine palladium nitrate is described. A 10 gram quantity of tetraamine palladium nitrate is dissolved in 30 cc of de-ionized water. Following approximately 10 hours of stirring, the tetraamine palladium nitrate is dissolved into a solution as represented in container 80.

The solution of the hydrogen storage material may be placed within the interior spaces of a supply of PWHGMs as disclosed herein. In the current example, the sample of PWHGMs used range in size from about 10 to about 200 microns in diameter, have a wall thickness of between about 1 to about 10 microns, a wall pore diameter of between about 10 to about 1000 angstroms, and a density of about 1.7 g/cc. A sample of 0.5 grams PWHGMs is placed in the sample container 50 which is then placed within the interior of vacuum chamber 52. The valve 62 is kept closed while the vacuum valve 60 is opened. The vacuum pump 70 is used to evacuate the vacuum chamber 52.

A pressure sensor 90 is responsive to conditions within the vacuum chamber 52 and is used to monitor the conditions within the vacuum chamber.

When a vacuum of less than 1 torr is achieved, the vacuum valve is closed and valve 62 is opened to allow the hydrogen storage material solution from container 80 to flow into the interior of container 50. The solution level introduced into container 50 must be of sufficient volume to cover the PWHGMs 10. Once covered, valve 62 is closed and the vacuum chamber is opened. Container 50 containing PWHGMs 10 and the hydrogen storage solution material is removed.

Following removal from the vacuum chamber, it is observed that the PWHGMs 10 will settle at the bottom of sample container 50. The remaining solution of hydrogen storage material is decanted from container 50 and the wet sample of the PWHGMs 10 is dried under vacuum.

The dried sample is then used to repeat the above procedure for a total of 5 cycles of vacuum introduction of a hydrogen storage material solution. Following the final addition of the hydrogen storage material solution, the The PWHGMs are subsequently transferred to a tubular container having two inlets and two outlet ports on corresponding ends of the container. Porous metal filters are installed on the inlets and outlets to prevent the PWHGM samples from escaping from the container.

A hydrogen gas stream is introduced at a rate of about 50 cc/minute at room temperature. The temperature of the container is increased by about 50° C. every 10 minutes until a temperature of approximately 450° C. is reached. The sample is maintained at about 450° C. for 2 hours with continuous hydrogen gas flow followed by cooling in the presence of hydrogen gas flow until the temperature of the container is less than 50° C.

The above exposure to elevated temperatures and hydrogen gas reduces the tetraamine palladium nitrate present within the PWHGMs to palladium metal. The presence of palladium within the microsphere's interior was confirmed using the x-ray measurements and scanning electron micrographs. The scanning electron micrographs were taken of microspheres which had been opened by crushing, revealing that an interior portion of the microsphere shells were filled with palladium.

While the above example is directed to the conditions and techniques for a specific hydrogen storage material, it is envisioned that a variety of aqueous and non-aqueous solutions of a hydrogen storage material may be introduced into the interior of a hollow glass microsphere using either pressure, vacuum, or a combination of such techniques. Further, depending upon the introduced hydrogen storage material, the reducing conditions in terms of hydrogen gas flow rates, reducing temperature, and reducing pressure may all be varied to achieve optimal reduction by hydrogen of the specific introduced hydrogen storage and thereby achieve a desired end product of a reduced hydrogen storage material.

Example 2 is directed to a process of applying a vacuum to the PWHGMs followed by the return of normal atmospheric conditions. However, once a hydrogen storage material solution is surrounding the PWHGMs, it is recognized that similar results can be achieved by the application of external pressure relative to a starting pressure of the PWHGMs and surrounding hydrogen storage hydrogen storage material solution is surrounding the PWHGMs, it is recognized that similar results can be achieved by the application of external pressure relative to a starting pressure of the PWHGMs and surrounding hydrogen storage material. However, the procedure as set forth in Example 2 is believed to offer a greater efficiency and operating economy than other techniques. By first removing ambient gasses from the interior of the PWHGMs, a surrounding liquid solution is more easily introduced into the interior of the PWHGMs by the simple restoration of ambient pressure to the system.

For certain applications, it is noted that by additional heating of the PWHGMs to a temperature of about 1000° C., the porosity can be removed and/or selectively reduced by controlling the temperature and treatment time intervals. It is believed advantageous for some hydrogen storage materials to subsequently remove the porosity once the hydrogen storage material is inserted into the interior of the PWHGM. Hydrogen can still be cycled into and out of the hydrogen storage material by using sufficient pressure and temperature combinations as are well known in the art. However, by removing the pores and/or substantially reducing the size of the pores, the hydrogen storage material is protected from gaseous poisons that could render the hydrogen storage material inactive.

The resulting PWHGM containing a hydrogen absorbent offers numerous advantages for use with hydrogen absorbing technologies. For instance, when palladium metal and other metal hydrides are used in a hydrogen absorption/desorption process, the hydrogen storage material tends to fracture into smaller particles or "fines." The resulting fines can clog filters, limiting gas flow through the filtration bed in hydrogen separation devices, and/or blocking gas flow in hydrogen storage devices resulting in an overall loss of efficiency of the hydrogen absorption/desorption system. However, when encapsulated within the PWHGM, the resulting fines are contained within the PWHGM and continue to function in an absorption/desorption capacity.

Additionally, it is possible to select PWHGMs having a sufficiently small pore size such that gaseous poisons which may interfere with the hydrogen absorbing material are physically excluded from entry into the interior of the HGM. As a result, the PWHGM functions as a selective membrane which permits the flow of hydrogen gas into and out of the PWHGM while preventing the entry of larger gaseous or liquid molecules.

While it is possible to force hydrogen into and out of solid-walled (non-pore structure) microspheres, the use of PWHGMs allows hydrogen gas to enter and exit the microspheres at much lower pressures and temperatures. Consequently, less strenuous rehydriding/dehydriding conditions can be employed using the porous wall structure as a conduit to enable the passage of hydrogen gas through the wall of the glass microsphere.

Where the pore sizes of the resulting PWHGM are sufficiently large that gaseous poisons or other materials could enter, it is possible to provide barrier coatings to the exterior of the PWHGMs. The various barrier coatings may be selected for special properties so as to provide for selective membrane properties. One such coating material is a sol gel material having a sufficiently defined pore structure that provides for a barrier against gaseous poisons while permitting the flow of hydrogen gas therethrough. One such sol gel material may be found in reference to the commonly assigned U.S. Pat. No. 5,965,482, and which is incorporated herein by reference.

The PWHGMs containing therein a hydrogen storage material, offer additional advantages within the hydrogen storage technology field. The PWHGMs used in accordance with the present invention may have diameters of between about 1 micron to about 200 microns. Given the size and selectable particle densities, the resulting PWHGMs have fluid-like properties which make the PWHGMs suitable for easier transport and bulk storage. For instance, transportation of large quantities of filled PWHGMs may be made utilizing existing pipelines to convey the supplies of petroleum products and/or natural gas.

Though the collective volume of hydrogen storage material may contain enormous quantities of stored hydrogen gas, the transport is much safer in that the hydrogen is stored within a plurality of discrete PWHGM vessels. As a result, the dangers associated with the storage of a comparable volume of hydrogen gas is greatly lessened since the volume is now distributed within a large number of individual PWHGM vessels. The individual PWHGMs provide an enhanced level of safety against explosion and fire in that there are no exposed large volumes of hydrogen gas. For example, a leak or release of PWHGMs containing releasable hydrogen has a much reduced threat of explosion or fire since no free hydrogen is available. Even if released into flame or high temperature conditions, the insulating properties of the PWHGMs are such that the net result is a series of very small releases of hydrogen gas as opposed to a release of a single large volume of hydrogen gas.

While palladium represents one hydrogen storage material which may be incorporated into the interior of the PWHGMs, it should be noted that a variety of other hydrogen storage materials are also suitable for use within the interior of the PWHGMs. Such materials include sodium aluminum hydride, lithium aluminum hydride, titanium aluminum hydride, complex hydrides, and various fused or hybrid hydrogen storage materials such as those described in commonly assigned PCT application PCT/US03/34980 which is incorporated herein by reference, and various catalyzed borohydrides as described in commonly owned U.S. application entitled "Catalyzed Borohydrides For Hydrogen Storage having application Ser. No. 11/130,750, filed on May 17, 2005, and which is incorporated herein by reference, and combinations of these hydrogen storage materials. Additionally, the PWHGMs may be utilized to provide a "protective environment" for reactive hydrides or other hydrogen storage materials which occupy the hollow interior of the PWHGMs.

It is within the scope of the present invention to provide for a number of different hydrogen storage materials which may be contained within the interior of a suitable PWHGM. Doing so would allow a plurality of different hydrogen storage media to be utilized within a given application. For instance, within a given volume of PWHGMs, there could be two or more different hydrogen storage materials present within discrete populations of microspheres having different hydrogen release properties. In this way, the volume of evolved hydrogen gas may be controlled or regulated by the appropriate environmental conditions or stimuli needed to release the hydrogen.

In addition, the use of the PWHGMs greatly simplifies commercial recharging of the spent hydrogen storage material. For instance, where the PWHGMs containing the hydrogen storage material are used to power a device, the spent PWHGMs may be removed during a refueling operation and subsequently recharged. By allowing a separate recharging or hydrogen absorption process, the PWHGMs having a hydrogen storage material can be utilized in various environments such as a hydrogen-powered motor vehicle. To the extent the vehicle only needs to provide for a hydrogen release mechanism, the mechanics and operation of the vehicle may be greatly simplified. Upon refueling with a fresh supply of PWHGMs (containing hydrided hydrogen storage material) the spent PWHGMs are simply removed for subsequent rehydriding.

It is also envisioned that the formation of PWHGMs may be simplified by selection of an appropriate hydrogen storage material to serve as the source of the nucleating gas. In other words, a hydrogen storage material which, when heated, may release hydrogen or other inert gas that may be used as the blowing agent for the resulting microsphere. It may be possible to use a hydrogen storage or precursor material which evolves a nucleating agent when heated. As a result, it may be possible to form the PWHGMs directly around a hydrogen storage material.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. The process of making a hydrogen storage apparatus comprising the steps of:
   forming a hollow glass microsphere having an extractable phase;
   removing said extractable phase, thereby providing a porous wall hollow glass microsphere said porous wall defining a plurality of pores which provide communication between an interior and an exterior of the porous wall hollow glass microsphere, said porous wall hollow glass microspheres having a diameter of between about 1.0 to about 200 microns, a density of about 1.0 to about 2.0 gm/cc, and an average pore size in arrange from about 10 to about 1,000 angstroms;
   introducing through said plurality of pores a hydrogen storage material into an interior of said porous wall hollow glass microsphere via a pressure differential;
   heating said porous wall hollow glass microsphere containing said hydrogen storage material to a temperature of about 1000° C. and thereby decreasing the porosity of the porous wall hollow glass microspheres, said decrease in porosity excluding the passage of gaseous poisons into the interior of said porous wall hollow glass microsphere;
   wherein said hydrogen storage apparatus can reversibly release and store hydrogen said hydrogen entering and exiting said storage apparatus through said plurality of pores.

2. A process of introducing a hydrogen storage material into an interior of a porous wall hollow glass microsphere comprising:
   providing a supply of porous wall hollow glass microspheres, said porous walls defining a plurality of pores which provide communication between an interior and an exterior of said glass microspheres, said porous wall hollow glass microspheres having a diameter of between about 1.0 to about 200 microns, a density of about 1.0 to about 2.0 gm/cc, and an average pore size in arrange from about 10 to about 1,000 angstroms;
   subjecting said supply of porous wall hollow glass microspheres to a partial vacuum, thereby decreasing the volume of ambient gasses contained within the interior spaces of said porous wall hollow glass microspheres;
   surrounding said porous wall hollow glass microspheres with a solution containing a hydrogen storage material while said porous wall hollow glass microspheres are at a reduced pressure;
   increasing the pressure surrounding said porous wall hollow glass microspheres and said hydrogen storage material containing solution, thereby introducing the hydrogen storage containing solution into the interior spaces of said porous wall hollow glass microspheres;
   removing the excess hydrogen storage containing solution from the supply of porous wall hollow glass microspheres;
   drying the porous wall hollow glass microspheres, heating said porous wall hollow glass microsphere containing said hydrogen storage material to a temperature of about 1000° C. and thereby decreasing the porosity of the porous wall hollow glass microspheres, said decrease in porosity excluding the passage of gaseous poisons into the interior of said porous wall hollow glass microsphere; and, reducing the hydrogen storage material within the porous wall hollow glass microspheres using a combination of hydrogen gas and heat, thereby providing a plurality of porous wall hollow glass microspheres containing reduced hydrogen storage material within the interior of the microsphere.

3. A process of introducing a hydrogen storage material into an interior of a porous wall hollow glass microsphere comprising:

providing a supply of porous wall hollow glass microspheres, said porous walls defining a plurality of pores which provide communication between an interior and an exterior of said glass microspheres, said porous wall hollow glass microspheres having a diameter of between about 1.0 to about 200 microns, a density of about 1.0 to about 2.0 gm/cc, and an average pore size in arrange from about 10 to about 1,000 angstroms;

subjecting said supply of porous wall hollow glass microspheres to a partial vacuum, thereby decreasing the volume of ambient gasses contained within the interior spaces of said porous wall hollow glass microspheres;

surrounding said porous wall hollow glass microspheres with a palladium solution while said porous wall hollow glass microspheres are at a reduced pressure;

increasing the pressure surrounding said porous wall hollow glass microspheres and said palladium solution, thereby introducing a portion of the palladium solution into the interior spaces of said porous wall hollow glass microspheres;

removing the excess palladium solution from the supply of porous wall hollow glass microspheres;

drying the porous wall hollow glass microspheres and the portion of the palladium solution, heating said porous wall hollow glass microsphere containing said hydrogen storage material to a temperature of about 1000° C. and thereby decreasing the porosity of the porous wall hollow glass microspheres, said decrease in porosity excluding the passage of gaseous poisons into the interior of said porous wall hollow glass microsphere; and, reducing a dried palladium component within the porous wall hollow glass microspheres using a combination of hydrogen gas and heat, thereby providing a plurality of porous wall hollow glass microspheres containing reduced palladium within the interior of the microsphere.

4. The process according to claim 3 wherein said palladium solution further comprises tetraamine palladium nitrate.

5. The process according to claim 3 wherein the reducing step further includes exposing the palladium material within the interior of the porous wall hollow glass microspheres to an environment of hydrogen gas and at a temperature of about 450° C.

6. The process according to claim 3 wherein said partial vacuum is at a value of about 1 torr and said step of increasing the pressure further includes increasing the pressure to normal atmosphere.

\* \* \* \* \*